United States Patent [19]

House et al.

[11] Patent Number: 4,961,293

[45] Date of Patent: Oct. 9, 1990

[54] PRECAST, PRESTRESSED CONCRETE SECONDARY CONTAINMENT VAULT

[75] Inventors: Randall House, P.O. Box 700248, San Antonio, Tex. 78270; Jesse Covarrubias, San Antonio, Tex.; JoHann H. Hofmann, San Antonio, Tex.; Jerry Powell, San Antonio, Tex.

[73] Assignee: Randall House, San Antonio, Tex.

[21] Appl. No.: 295,821

[22] Filed: Jan. 10, 1989

[51] Int. Cl.⁵ .................... E04C 3/10; E02D 29/14
[52] U.S. Cl. .................... 52/21; 52/223 R; 52/169.6; 52/595
[58] Field of Search ............ 52/128, 249, 224, 227, 52/245, 20, 595, 169.6, 173 R, 21; 220/18

[56] References Cited

U.S. PATENT DOCUMENTS

| | | | |
|---|---|---|---|
| 396,040 | 1/1889 | Hough | 52/227 |
| 764,459 | 7/1904 | Hackman | 52/245 |
| 1,023,815 | 4/1912 | Clarkson | 52/20 |
| 1,049,269 | 12/1912 | Robinson | 52/140 |
| 1,182,872 | 5/1916 | Darrow | 52/245 |
| 1,188,446 | 6/1916 | Haines | 222/205 |
| 1,371,205 | 3/1921 | Nashlund | 98/115.1 |
| 1,679,678 | 8/1928 | Mulder et al. | 98/42.02 |
| 1,908,332 | 5/1933 | Eichelman et al. | 52/169.7 |
| 1,920,101 | 7/1933 | Nagel | 52/142 |
| 2,040,578 | 5/1936 | Venzie | 52/228 |
| 3,230,674 | 1/1966 | Christensen | 52/128 |
| 3,260,025 | 7/1966 | Van Der Lely | 52/225 |
| 3,263,378 | 8/1966 | Dorris | 52/245 |
| 3,429,473 | 2/1969 | Vroman et al. | 52/593 |
| 3,640,038 | 2/1978 | Heron | 52/224 |
| 3,848,765 | 11/1974 | Durkop | 220/18 |
| 3,965,630 | 6/1976 | Roberts | 52/224 |
| 4,183,221 | 1/1980 | Yamamoto | 52/249 |
| 4,607,522 | 8/1986 | Sharp | 220/449 |
| 4,638,920 | 1/1987 | Goodhues | 220/18 |

FOREIGN PATENT DOCUMENTS

| | | | |
|---|---|---|---|
| 1434573 | 11/1968 | Fed. Rep. of Germany | 52/249 |
| 2159960 | 6/1973 | Fed. Rep. of Germany | . |
| 527562 | 7/1921 | France | 52/20 |
| 859237 | 6/1940 | France | 52/173 |
| 939124 | 4/1948 | France | 52/228 |
| 1002370 | 12/1951 | France | 264/32 |
| 421913 | 6/1947 | Italy | 52/249 |
| 524404 | 4/1955 | Italy | 52/245 |
| 572667 | 2/1958 | Italy | 52/224 |
| 42819 | 5/1926 | Norway | 52/595 |
| 423919 | 5/1967 | Switzerland | 52/21 |
| 471727 | 6/1989 | Switzerland | . |
| 780618 | 8/1957 | United Kingdom | 52/169.6 |

OTHER PUBLICATIONS

Chemical Engineering Vol. 94, No. 4, 16 March 1987, (New York, N.Y. US), D. L. Russel, et al: "Underground Storage Tanks", pages 61–69, see 62, column 2, line 11, and page 63, column 2, line.

Primary Examiner—James L. Ridgill, Jr.
Attorney, Agent, or Firm—Gunn, Lee & Miller

[57] ABSTRACT

A precast, prestressed concrete secondary containment vault comprised of a sloped, watertight bottom unit capable of holding a primary tank's entire contents, a collar unit sealed to the bottom unit by post-tensioned strands, top panels capable of supporting vehicles, a manhole providing access to permit direct inspection of the primary tank, and means for monitoring, ventilating and pumping the vault. Double-wall pipes for connecting the primary tank to external units and for directing any pipe leakage to the bottom unit are disclosed. The disclosed vault permits the use of less expensive, single-wall tanks which may be repaired in the vault or replaced by removing the top panels.

6 Claims, 6 Drawing Sheets

4,961,293

PRECAST, PRESTRESSED CONCRETE SECONDARY CONTAINMENT VAULT

FIELD OF THE INVENTION

This invention relates to a precast, prestressed concrete secondary containment vault comprised of a sloped, watertight bottom unit capable of holding a primary tank's entire fluid contents, a collar unit joined with the bottom unit by a reservoir joint, top panels capable of supporting vehicles, a manhole providing access to permit direct inspection of the primary tank, and means for monitoring, ventilating and pumping the vault. Double-wall pipes for connecting the primary tank to external units and for directing any pipe leakage to the bottom unit are disclosed. The disclosed vault permits the use of less expensive, single-wall tanks which may be repaired in the vault or replaced by removing the top panels.

DESCRIPTION OF THE PRIOR ART

A concrete gasoline storage device is disclosed in U.S. Pat. No. 1,188,446 issued to Haines. This invention uses a large, concrete storage container connected to a smaller concrete container. Gasoline is pumped from the larger container to the smaller container through a series of pipes. The large concrete container functions as a long term storage device and the smaller, separate concrete container functions as a short term holding device before the gasoline is supplied to vehicles.

A concrete burial vault is disclosed in U.S. Pat. No. 1,920,101 issued to Nagel. Construction of the Nagel vault requires the onsite assembly of separate precast units. The separate precast units' weight are reduced through the use of inner-face panels with reinforcing bars and ribs. The vault may be built to be waterproof or may allow drainage through knockout members of one of the units.

Another precast liquid storage tank is U.S. Pat. No. 3,429,473 issued to Vroman et al. Vroman discloses a liquid storage tank comprised of precast concrete segment walls, roof panel members, and beam elements which upon assembly uniquely interlock with each other to form an inherently stable watertight structure. The beam elements and wall and roof panel members may be assembled in varying numbers to form various different tank sizes.

The United States faces a multi-billion dollar storage problem. The usual methods of storing liquids, chemicals, and hazardous materials are no longer acceptable. Gasoline stations, for example, have used single-wall tanks for their onsite gasoline storage. After a relatively short time, these underground storage tanks leak—contaminating the groundwater and the surrounding land and endangering the public. Detecting these leaks is difficult and usually only occurs after gasoline has been leaking for years. Replacing or repairing these underground tanks is very expensive and time consuming. Thus, there has been a long felt commercial need for a storage method which would contain any leaks and allow easy detection and easy repair of leaking tanks. The instant invention satisfies this long felt commercial need.

SUMMARY OF THE INVENTION

It is an object of the present invention to provide an inexpensive alternative to the use of double-wall storage containers. This invention allows the use of single-wall storage containers which can be directly inspected for any leaks or other container problems.

Another object of this invention is to provide a waterproof containment vault for any liquid leaks which may occur during liquid storage and handling.

A further object of this invention is to provide monitoring capabilities to liquid storage tanks which alert the operator of any leaks in the storage tank or transport pipes.

Still a further object of this invention is to provide a method of extracting any fluid accumulation and exhausting any fumes.

Additional advantages, objects and uses will be apparent from the description to those familiar with the relevant art.

The foregoing objectives are achieved in a precast secondary containment vault which has a sloped, watertight bottom unit capable of holding a primary tank's entire fluid contents, a collar unit joined to the bottom unit by an impermeable reservoir joint, top panels capable of supporting vehicles, a manhole providing access to permit direct inspection of the primary tank, and means for monitoring, ventilating and pumping the vault. Double-wall pipes for connecting the primary tank to external units and for directing any pipe leakage to the bottom unit are disclosed.

DESCRIPTION OF THE PREFERRED EMBODIMENT

Figure 1:
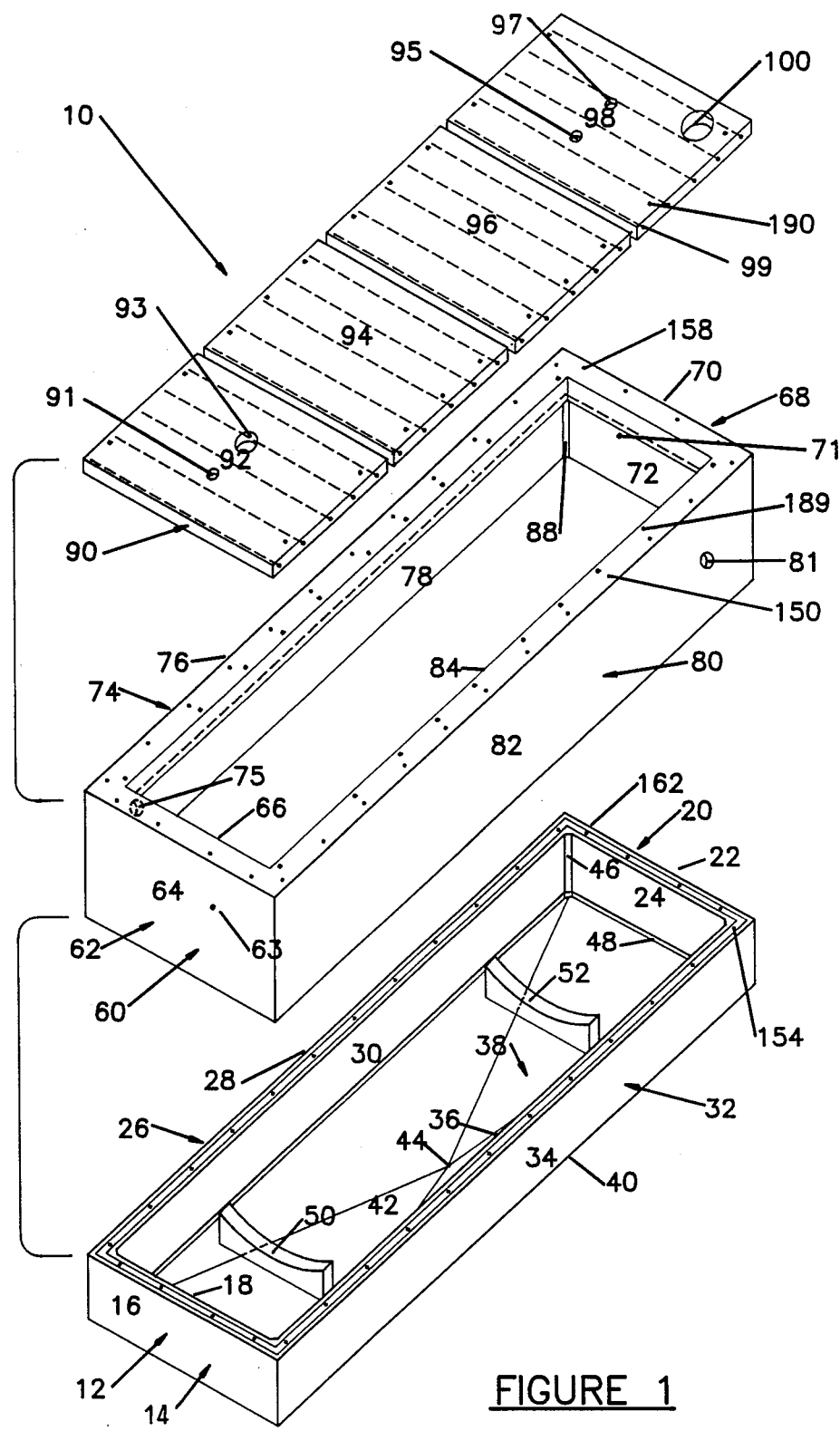
FIG. 1 is an expanded perspective view of one embodiment of a precast, prestressed secondary containment vault without the primary containment vessel.

Reference to FIG. 1, one embodiment of the precast, prestressed secondary containment vault 10 according to the present invention, includes a pretensioned concrete bottom unit 12, a pretensioned concrete collar unit 60, and a pretensioned top unit 90.

The pretensioned concrete bottom unit 12 has a rectangular shape formed by first and second ends 14, 20 and first and second longitudinal sides 26, 32. One side of the remaining two open sides is closed with the bottom side 38.

The exterior of the bottom unit 12 is formed by the outer faces 16, 22 of the first and second ends 14, 20 and by the outer faces 28, 34 of the first and second longitudinal sides 26, 32 and by the lower face 40 of the bottom side 38.

The interior of the bottom unit 12 is formed by the inner faces 18, 24 of the first and second ends 14, 20 and by the inner faces 30, 36 of the first and second longitudinal sides 26, 32 and by the inner face 42 of the bottom side 38. The first and second ends 14, 20 and the first and second longitudinal sides 26, 32 are cast with obtuse angled inner corners 46 for reinforcement. The reinforcement may also include conventional reinforcement. The bottom side 38 is joined to the first and second ends 14, 20 and the first and second longitudinal sides 26, 32 at an obtuse angled inner seam 48 for reinforcement. The reinforcement may also include conventional reinforcement. The inner face 42 of the bottom side 38 slopes from the corners 46 to a point 44 approximately in the middle of the bottom side 38.

The inner faces 18, 24, 30, 36, 42 and the inner corners 46 and inner seam 48 of the bottom unit are coated with a material which is nondeteriorating and impermeable to the material stored in the primary containment vessel 170. Outer faces 16, 22, 28, 34, 40 of the bottom unit 12 are coated with water proofing material. The ends 14, 20 and sides 26, 32 rise vertically from the bottom side 38 to a sufficient height so as to form a cavity which can contain the entire contents of the storage container. Cradles 50, 52 for supporting liquid storage tanks are contained within the bottom unit 12.

The pretensioned concrete collar unit 60 has a rectangular shape essentially identical to the bottom unit 12. The collar unit 60 has first and second ends 62, 68 and first and second longitudinal sides 74, 80.

The exterior of the collar unit 60 is described by the outer faces 64, 70 of the first and second ends 62, 68 and by the outer faces 76, 82 of the first and second longitudinal sides 74, 80.

The interior of the collar unit 60 is formed by the inner faces 66, 72 of the first and second ends 62, 68 and by the inner faces 78, 84 of the first and second longitudinal sides 74, 80. The first and second ends 62, 68 and the first and second longitudinal sides 74, 80 are cast with obtuse angled inner corners 88 for reinforcement. The reinforcement may also include conventional reinforcement.

The pretensioned concrete collar unit 60 has a multitude of equally spaced anchor post holes 150 which align with the access holes 154 of the bottom unit 12. Post-tensioning strands 151 are routed through the anchor post holes 150, through vertical channels 152 (see FIG. 2), through access holes 154, and through U-shaped channels 156 of the bottom unit 12 (see FIG. 2) to lock the collar unit 60 to the bottom unit 12.

The first and second ends 62, 68 of the collar unit 60 have openings 63, 71 for ventilation which may be passive, active, or combination passive/active. If desired, the ventilation openings 63, 71 may instead be in the first and second longitudinal sides 74, 80. The ventilation openings are approximately three inches in diameter but can vary from one inch to eighteen inches. If passive ventilation is desired, then air to and from the vault will be conveyed by underground fiberglass or PVC piping from openings 63, 71 to above ground supply and discharge ducts. If active ventilation is desired, then a vault mounted fan will be connected to the air discharge pipe. The vault mounted fan will draw air through the vault to induce a negative pressure within the vault, thereby promoting evaporation of any moisture or vapors in the vault. The ventilation fan will create an air flow capable of ten air changes per hour, but could vary from five to twenty air changes. The ventilation will automatically shut off if vapors are detected in the ventilation system so as to prevent vapors from being forced into the atmosphere.

If a combination passive/active system is desired, the ventilation fan will be operated only when specifically demanded, e.g., after a leak has occurred or before a person enters the vault.

The first and second longitudinal sides 74, 80 of the collar unit 60 have openings 75, 81, each with a diameter of approximately fourteen inches, but the diameter can vary from four inches to thirty-six inches. Openings 75, 81 provide means for piping access to the primary containment vessel 170 (see FIG. 2) from the exterior of the secondary containment vault 10.

The inner faces 66, 72, 78, 84 and inner corners 88 may be coated with a material which is nondeteriorating and impermeable to the material stored in the primary containment vessel 170. The outer faces 64, 70, 76, 82 are coated with waterproofing material.

The pretensioned top unit 90 has a rectangular shape substantially similar to the collar unit 60. The pretensioned concrete top unit 90 is comprised of separate panel units 92, 94, 96, 98. Each panel unit may have notched edges for expansion material or sealing material. A manhole 100 allows access through the top unit 90 to the interior of the secondary containment vault 10. The top unit 90 also has openings 91, 92, 95, 97 of various sizes for fill piping, vapor release, pump removal, and other purposes. The openings 91, 92, 95, 97 are approximately eight inches in diameter, but can vary from four inches to twenty-four inches. The openings 91, 92, 95, 97, and 100 have lips raised about one inch from the top surface of the top unit 90. These raised lips minimize the opportunity for rain and other liquids from draining into the interior of the secondary containment vault 10. The manhole 100 may have a locking cover to minimize unauthorized access to the interior of the secondary containment vault 10.

The pretensioned concrete top unit 90 has vertical channels 190 which align with the vertical channels 189 of the collar unit 60. A multitude of coil rods 191 are inserted through the vertical channels 190, 189 to lock the top unit 90 to the collar unit 60. The top unit 90 is sufficiently reinforced by the pretensioning strands and conventional reinforcing methods like reinforcing rods 99 or wire mesh to support the full traffic loading, HS 20 loading, as designed by the American Association of State Highway and Transportation Officials.

Figure 2:
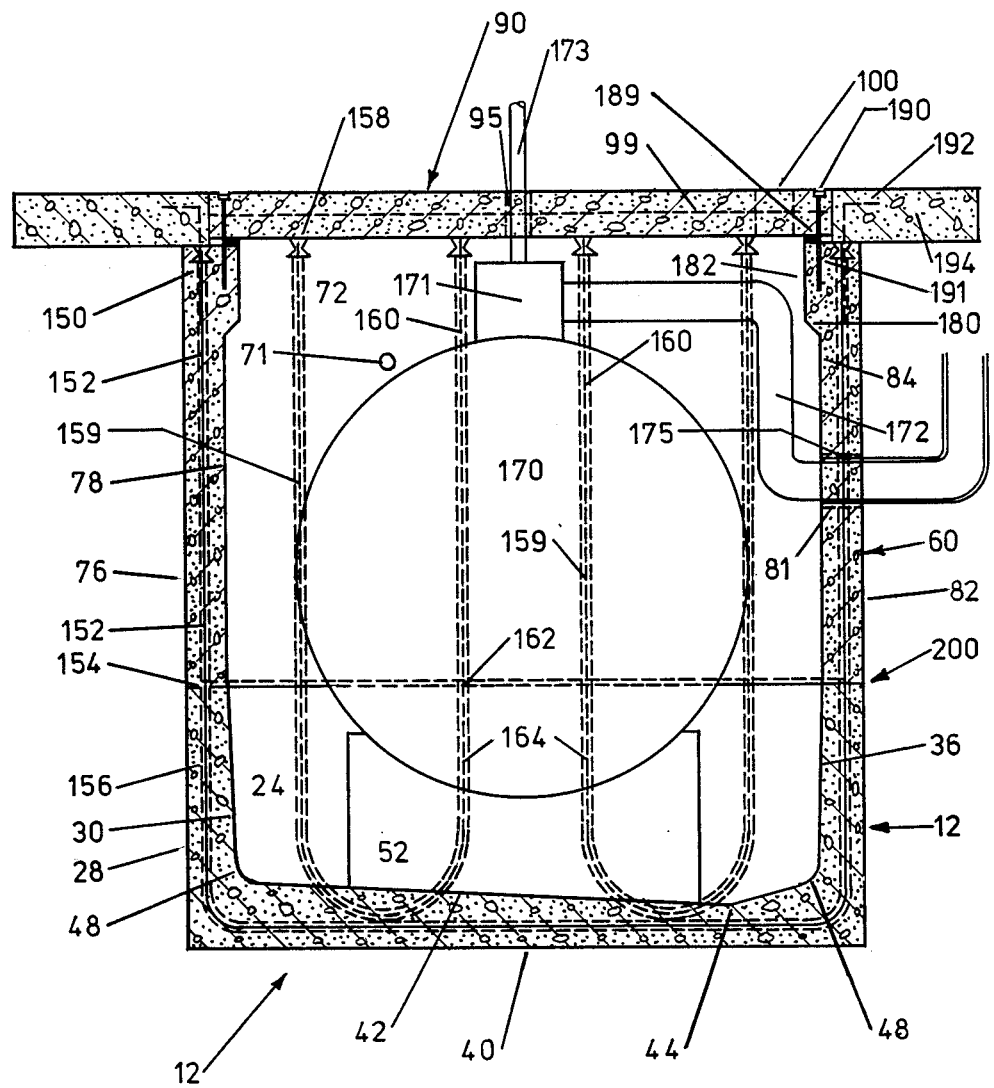
FIG. 2 is an end cross-sectional view of the precast, prestressed secondary containment vault illustrated in FIG. 1.
Figure 3:
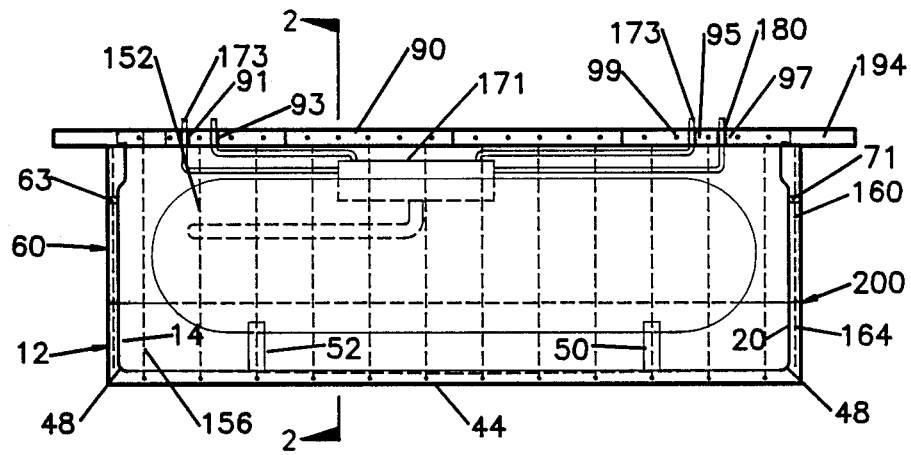
FIG. 3 is a longitudinal cross-sectional view of the precast, prestressed secondary containment vault illustrated in FIG. 1.

With reference to FIG. 2, a cross section of a second embodiment for liquid storage is shown. Located at the top of the primary containment vessel are fittings 171 for connecting piping 173 to the primary containment vessel 170. The piping 173 may be single or double-wall and may be used for the purpose of ventilating the tank during filling with or evacuation of liquid. The piping 172 of FIG. 3 is connected to the primary containment vessel 170 by a fitting 171 or submersible pump manifold and is double-wall piping sloped from the extremity of the piping to the interior of the secondary containment vault 10. The double-wall piping 172 may be used for conveyance of liquid to exterior dispensing units. The outer wall 175 of the double-wall piping 172 starts at or near the openings 75, 81 of the first and second longitudinal sides 76, 82 of the collar unit 60 and extends to exterior dispensing units. If any leakage occurs in the inner pipe of the double-wall piping 172 the piping's slope will direct the liquid via the outer wall 175 of the double-wall piping 172 to the interior of the secondary containment vault 10. The double-wall piping may have sensors which will alert the operator that a leak has occurred in the double-wall piping 172. The liquid will collect at the bottom face 42 and drain to sump location 44 where it can be removed.

The collar unit 60 has a relatively unprofiled, vertical, outer longitudinal faces 76, 82. The inner longitudinal faces 78, 84 have profiled reinforcing concrete 182 at the top of the collar unit 60. The reinforced concrete 182 extends vertically from the top of the collar unit 60 to an outwardly sloping surface 180. The outwardly sloping surface 180 extends from the reinforced concrete 182 to the inner face 84. The inner face 84 slopes vertically from the outwardly sloping surface 180 to the bottom of the collar unit 60. The bottom of the collar unit 60 forms a reservoir joint 200 with the top of the bottom unit 12.

The bottom unit 12 has a relatively unprofiled, outer longitudinal face 34 which slopes vertically from the top of the bottom unit 12 to the outer bottom face 40. The outer bottom face 40 extends horizontally from the outer longitudinal face 34 to the relatively unprofiled, outer longitudinal face 28. The outer longitudinal face 28 rises vertically from the outer bottom face 40 to the top of the bottom unit 12.

The interior of the bottom unit 12 has relatively unprofiled inner longitudinal faces 30, 36. The inner longitudinal faces 30, 36 slope inward from the top of the bottom unit 12 to reinforcing inner seams 48. The reinforcing inner seams 48 join the inner longitudinal faces 30, 34 to the inner bottom face 42. The inner bottom face 42 slopes from the reinforcing inner seams 48 to a point 44 located closer to inner longitudinal face 36 than inner longitudinal face 30. This off-center point 44 allows a person to access the interior of the secondary containment vault 10 through the manhole 100 and quickly see if any leaks have occurred.

The primary containment vessel 170 is supported by cradle 52 above the inner face 42 of the bottom unit 12 allowing sufficient crawl space around the interior of the precast, prestressed secondary containment vault 10 to permit direct physical inspection of the primary containment vessel 170 and repair if required and direct physical inspection of the interior of the precast, prestressed secondary containment vessel 10.

The end face 72 of the collar unit 60 has equally spaced anchor post holes 158. These anchor post holes 158 allow access to vertically extending channels 160 of the collar unit 60. The channels 160 align with the access holes 162 of the bottom unit 12. The access holes 162 allow access to U-shaped channels 164 of the bottom unit 12. Post-tensioning strands 159 are inserted in through the anchor post holes 158, through the vertical channel 160, through the access holes 162, and in through the U-shaped channel 164. The strands 159 are then extracted out through the access holes 162, out through the vertical channel 160, and out through the anchor post holes 158. Post-tensioning strands 151 are inserted in through the anchor post holes 150, through the vertical channel 152 of first longitudinal side 74 of the collar unit 60, through the access holes 154 of the first longitudinal side 26 of the bottom unit 12, and through the channel 156 of the first longitudinal side 26 of the bottom unit 12. The strands 159 are then extracted out through the access holes 154 of the second longitudinal side 32 of the bottom unit 12, out through the vertical channel 152 of the second longitudinal side 80 of the collar unit 60, and out through the anchor post holes 150 of the second longitudinal side 80 of the collar unit 60. The strands 151, 159 are then locked and post-tensioned to lock the collar unit 60 to the bottom unit 12.

The top unit 90 has reinforcing rods 99 which reinforce the top unit 90 to allow vehicular traffic. The collar unit 60 is precast with the coil rods 191 embedded in the channels 189. The top unit 90 is aligned with the collar unit 60 so that the vertical channels 190 align with the channel 189 and coil rods 191. The top unit 90 is lowered so that the coil rods 191 are inserted through the channels 190 to lock the top unit 90 to the collar unit 60.

Cast-in-place concrete 194 is poured around the top unit 90 to reinforce the precast, prestressed secondary containment vault 10 by stiffening the longitudinal sides and ends to withstand the ambient earth pressure and to provide more ballast so that the precast, prestressed secondary containment vault 10 does not float up from its original position in the ground. The cast-in-place concrete 194 is attached to the collar unit 60 by a multitude of L-shaped connecting rods 192. The L-shaped rods 192 are precast into the collar unit 60 and shipped to the construction location as vertical rods. The rods are bent onsite to the desired L-shape.

With reference to FIG. 3, the primary liquid containment vessel 170 is supported by the cradles 50 and 52. The cradles 50, 52 may be precast as part of the bottom unit 12 or pinned to the bottom unit as separate units after the bottom unit 12 has been placed onsite. The top unit 90 has reinforcing rods 99 throughout the top unit 90. Cast-in-place concrete 194 surrounds the top unit 90. Post-tensioning strands 151 are inserted through the anchor post holes 150 and vertical channels 152 of the collar unit 60 and through the access holes 194 and U-shaped channels 156 of the bottom unit 12. Post-tensioning strands 159 are also inserted through the anchor post holes 158 and vertical channels 160 of the collar unit 60 and through the access holes 162 and U-shaped channels 164 of the bottom unit 12.

The inner face 42 of the bottom side 38 slopes from each corner 48 to a sump location 44. This sump location 44 is about equi-distance to end 20 as it is to end 14 and may contain means to signal the presence of fluid in the sump location 44.

Figure 4:
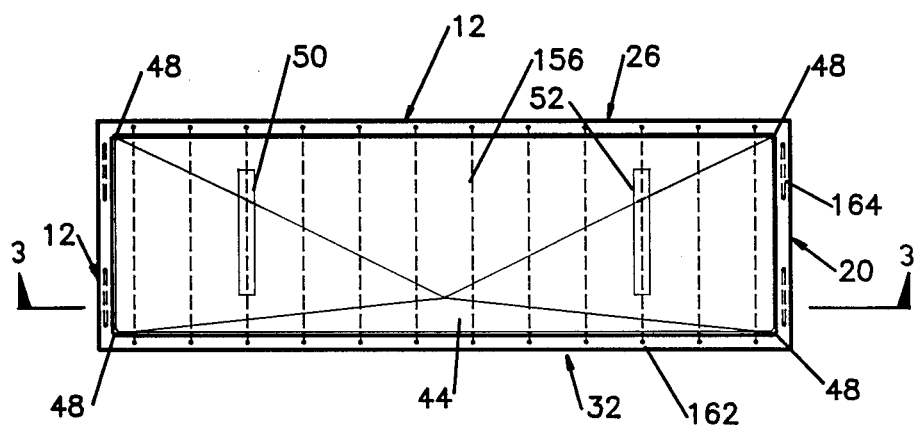
FIG. 4 is a bottom plan view of the bottom unit of the precast, prestressed secondary containment vault illustrated in FIG. 1.

With reference to FIG. 4, the bottom unit 12 is shown without the primary liquid storage vessel (see FIG. 3, number 170). The cradles 50, 52 are spaced to support the primary liquid storage vessel 170. The U-shaped channels 156 of the bottom unit 12 are evenly spaced throughout the bottom unit 12. The U-shaped channels 164 are uniformly spaced throughout the ends 12, 20 of the bottom unit 12.

The bottom inner face 42 of the bottom unit 12 slopes from each corner 48 to a point 44. The point 44 is located approximately equal distance from each end 12 and 20 and is located closer to longitudinal side 26 than to longitudinal side 32 of the bottom unit 12.

Figure 5:
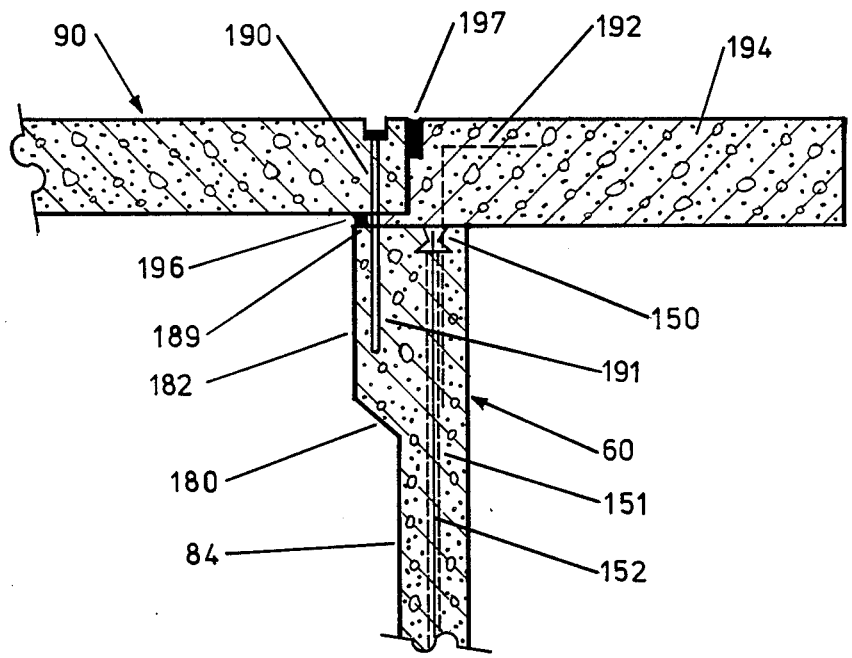
FIG. 5 is a cross-sectional view of the typical connection of the top unit, collar unit, and cast-in-place concrete of the precast, prestressed secondary containment vault illustrated in FIG. 1.

With reference to FIG. 5, the typical connection of the top unit 90, collar unit 60, and cast-in-place concrete 194 is shown. In operation, the collar unit 60 is precast. Before the concrete hardens a multitude of coil rods 191 and reinforcing rods 192 are placed throughout the collar unit. The coil rods 191 are placed at a channel 189 which will align with channels 190 of the top unit 90. The collar unit 60 is shipped with the reinforcing rods 192 vertical. After the collar unit 60 is onsite the reinforcing rods 192 are bent to their desired L-shape.

Post-tensioning strands are inserted through the anchor post holes 150 and through the vertical channels 152. The strands are then tensioned. Fiberboard or other sealing material 196 is then placed along the top of the collar unit 60. The primary containment vessel 170 is then lowered into the secondary containment vault 10.

After the primary containment vessel 170 is in place, the top unit 90 is aligned with the collar unit 60 and placed so as to rest on the fiberboard 196. The coil rod 191 is tightened to lock the top unit 90 to the collar unit 60.

Cast-in-place concrete 194 is poured around the top unit 90 and on top of the collar unit 60. The L-shaped reinforcing rods 192 are encased in the cast-in-place concrete 194. Sealing material 197 is placed between the top unit 90 and the cast-in-place concrete 194. The cast-in-place concrete 194 flows under the top unit 90 and is stopped by the fiberboard 196. Once hardened, the cast-in-place concrete provides a uniform weight bearing surface between the top unit 90 and the collar unit 60, and stiffens the longitudinal ends and sides to withstand the ambient earth pressure.

Figure 6:
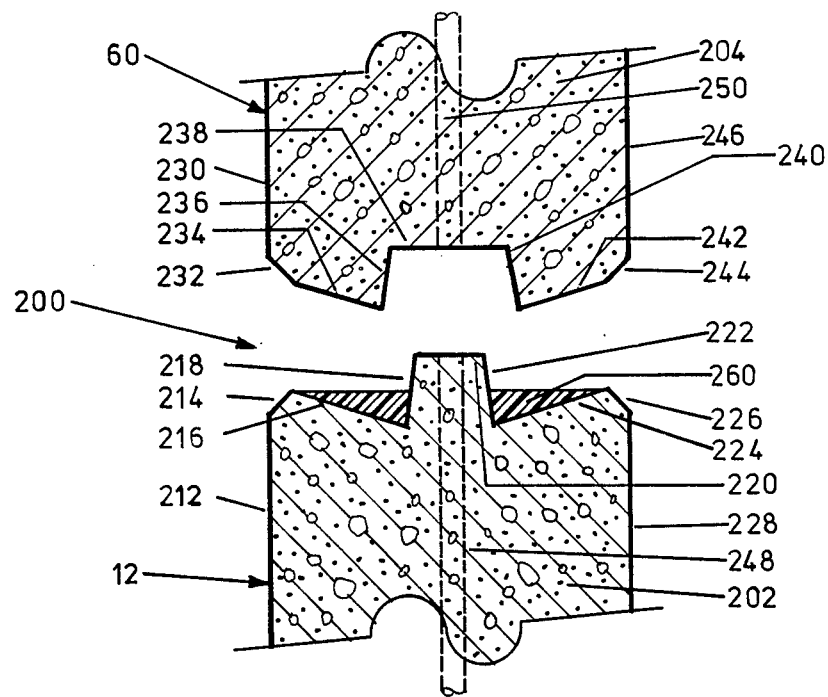
FIG. 6 is a cross-sectional view of the reservoir joint, before the female and male members are coupled, between the collar unit and bottom unit of the precast, prestressed secondary containment vault illustrated in FIG. 1.

With respect to FIG. 6, a typical cross-sectional view of the reservoir joint 200 between the bottom unit 12 and collar unit 60 is shown. The bottom unit 12 forms the male member 202 of the reservoir joint 200 and the collar unit 60 forms the female member 204 of the reservoir joint 200.

The male member 202 has a relatively unprofiled inner face 212. The inner face 212 rises vertically to an inner camber surface 214. The inner camber surface 214 extends from the inner face 212 to an inner top surface 216. The inner top surface 216 slopes downward from the camber surface 214 to an inner vertical surface 218. The inner vertical surface 218 rises vertically to a middle top surface 220. The middle top surface 220 extends horizontally from the inner vertical surface 218 to an outer vertical surface 222.

The outer vertical surface 222 slopes vertically downward to an outer top surface 224. The outer top surface 224 slopes upwardly to an outer camber surface 226. The outer camber surface 226 extends from the outer top surface 224 to an outer face 228. The outer face 228 is relatively unprofiled and slopes vertically downward.

The male member 202 has a channel 248 for inserting post-tensioning strands. Sealing material 260 is placed on the inner top surface 216 and outer top surface 224. Excess sealing material is scraped-off so that the sealing material is level with the inner and outer camber surfaces 214, 226.

The collar unit 60 forms the female member 204 of the reservoir joint 200. The female member 204 has a relatively unprofiled inner face 230 which slopes vertically downward to an inner top camber surface 232. The inner top camber surface extends from the inner surface 230 to an inner bottom surface 234. The inner bottom surface 234 slopes horizontally from the inner top camber surface 232 to an inner vertical surface 236. The inner vertical surface 236 slopes upward and inward at an almost vertical angle, which can vary from 45 degrees to 90 degrees, to a middle bottom surface 238. The inner bottom surface 238 slopes horizontally from the inner vertical surface 236 to an outer vertical surface 240.

The outer vertical surface 240 slopes downward and outward at an almost vertical angle, which can vary from 45 degrees to 90 degrees, to an outer bottom surface 242. The outer bottom surface 242 slopes horizontally from the outer vertical surface 240 to an outer camber surface 244. The outer camber surface 244 extends from the outer bottom surface 242 to an outer face 246. The outer face 246 is relatively unprofiled and rises vertically upward.

The female member 204 has a vertical channel 250 for inserting post-tensioning strands. The channel 250 aligns with channel 248 when the male member 202 and female member 204 of the reservoir joint 200 are joined forming a watertight joint.

Figure 7:
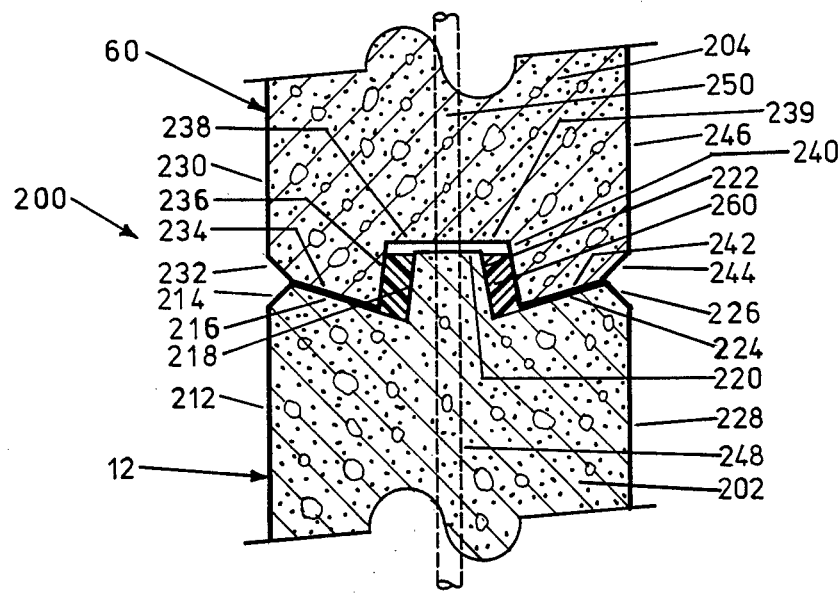
FIG. 7 is a cross-sectional view of the reservoir joint, after the female and male members are coupled, between the collar unit and bottom unit of the precast, prestressed secondary containment vault illustrated in FIG. 1.

With respect to FIG. 7, the typical reservoir joint is shown in a cross-sectional view after the male member and female member have been coupled. When the reservoir joint 200 is formed, the male member 202 of the bottom unit 12 is inserted into the female member 204 of the collar unit 60. The male member 202 fills up most, but not all, of the female member 204. A gap 239 of approximately one-half inch, which could vary from one sixteenth of an inch to six inches, is formed.

The volume of this gap 239 is larger than the volume of the sealing material 260 placed on the outer top surface 224 and the inner top surface 216. This excess volume in the gap 239 creates a low pressure area so that the sealing material 260 will move from its position on top of the inner and outer top surfaces 216, 224 up towards the gap 239 along the inner and outer vertical surfaces 218, 222. However, the sealing material will not reach the middle top surface 220 of the male member 202, thus the gap 239 also prevents the sealing material 260 from blocking the channels 248, 250. The sealing material 260 will also be forced outward from the inner and outer top surfaces 216, 224. This excess sealing material 260 can be dressed up to form a visually appealing reservoir joint 200.

The type of sealing material 260 used to form the reservoir joint 200 will depend on the type of material which will likely make contact with the reservoir joint 200. If different substances are expected on either side of the reservoir joint 200, then a different type of sealing material can be placed on the inner top surface 216 than on the outer top surface 224. This will create a non-deteriorating, impermeable reservoir joint 200.

Post-tensioning strands may be routed through channels 248, 250. Tensioning of the strands will ensure a uniform load bearing contact between the male member 202 and female member 204. The post-tensioning will also ensure the construction of an impermeable reservoir joint 200.

The actual construction of the precast, prestressed secondary containment vault 10 requires the vault 10 to be manufactured in three major sections: the bottom unit 12, the collar unit 60, and the top unit 90. The construction location is excavated and a sand bed is graded. The bottom unit 12 is lowered into the excavated pit and leveled. The cradles 50, 52 are then pinned to the inner face 42 of the bottom unit 12.

The male member 202 of the reservoir joint 200 is coated with a sealing material which is impermeable to the contained material and water. If required, the inner member may be sealed with a different sealing material than the outer member. Silicone based sealing materials or other non-brittle sealing materials will allow the later removal of the secondary containment vault 10. The sealing material 260 is leveled to remove an excess material. Four alignment rods are inserted into the top of the bottom unit 12. The collar unit 60 is then lowered to align with the alignment rods of the bottom unit 12.

As the collar unit 60 is lowered onto the bottom unit 12, the sealing material 260 is forced upward and outward from the reservoir joint 200. The upward moving sealing material 260 moves up along the inner and outer vertical surfaces 218, 222 but does not reach the inner bottom surface 238 of the female member 204. The sealing material 260 also does not obstruct the inlet to channel 248 of the male member 202 and the inlet to channel 250 of the female member 204. The outward moving sealing material 260 may be dressed up on the inside of the secondary containment vault 10 if desired.

Once the collar unit 60 is lowered onto the bottom unit 12, post-tensioning strands are routed through the channels 150, 160 of the collar unit 60 and the channels 156, 164 of the bottom unit 12. The strands are then tensioned at the anchor post holes 150, 158. The strands are tensioned in a uniform manner alternating from side to side and end to end. The tensioned strands ensure a watertight reservoir joint 200 and strengthen the structural integrity of the secondary containment vault 10.

After the tensioning of the strands, fiberboard 196 or other sealing material is placed around the inner member of the top of the collar unit 60. The primary containment vessel 170 is installed. The top panels 94, 96 are then lowered onto the fiberboard 196 of the collar unit 60. The panels are lowered so that the coil rods 191 are inserted through the channels 190 of the top panels 94, 96. The top panels 94, 96 are then tightened to the collar unit by tightening a nut on the coil rods 191.

Once the top panels 94, 96 are locked in, the excavation pit may be backfilled with sand or other appropriate material. Backfilling should not begin until the panels 94, 96 are in place because the panel 94, 96 provide structural support along the first and second longitudinal sides 74, 80.

After backfilling the excavation pit, the final hookups for the primary containment vessel 170 to the dispensing units by double-walled pipes and installation of the ventilation system may be completed. After all interior work is completed, the remaining panels 92, 98 are lowered and locked to the collar unit 60. Then, the rods 192 of the collar unit 60 are bent onsite into the desired L-shape. The sides and bottoms of the top unit 90 may be coated with a bond-breaker material to ensure that the top unit 90 may be removed later. This bond-breaker material will keep the cast-in-place concrete 194 from bonding with the top unit 90. The cast-in-place concrete 194 is then poured. Before the concrete hardens, the concrete is vibrated or forced into the slight gap between the top unit 90 and the collar unit 60 created by the fiberboard 196. Once this concrete hardens, a uniform load bearing surface is created which allows vehicle to travel over the top unit 90 without causing the panels to vibrate or pop loose.

The present invention of a precast, prestressed secondary containment vault discloses construction techniques and design features which can be easily adapted to various other uses and benefits. The secondary containment vault may be precast or cast-in-place and may be pretensioned or post-tensioned. The secondary containment vault can also be built in a variety of shapes, numerous different sizes to contain any size of a primary containment vessel, and may be used to contain many different materials. Additions to the disclosed invention are foreseen which will assist the United States in solving its multi-billion dollar storage problem.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description of this invention. It is therefore contemplated that the appended claims will cover such modifications that fall within the true scope of the invention.

We claim:

1. A precast secondary containment vault for holding a large primary containment vessel, such as a gasoline storage tank, that may contain a hazardous fluid, said precast secondary containment vault being transportable over existing highways and allowing physical and visual inspection of said large primary containment vessel by a normal size human, said precast secondary containment vault isolating said large primary containment vessel from vertical and lateral forces external, caused in part by external fluids, to said large primary containment vessel and isolating said large primary containment vessel from corrosive affects of soil, said precast secondary containment vault comprising:
   (a) a precast concrete bottom unit having a cavity therein for receiving said large primary containment vessel, said cavity being of sufficient size to hold all of said hazardous fluid if said large primary containment vessel was filled with said hazardous fluid and said large primary containment vessel leaked, said precast concrete bottom unit being
      (i) pretensioned and reinforced, and
      (ii) transportable over said highways;
   (b) means for making said precast concrete bottom unit impermeable to said hazardous fluid;
   (c) a precast concrete collar unit sized and shaped to fit on an upper portion of said precast concrete bottom unit, said precast concrete collar unit being
      (i) pretensioned and reinforced, and
      (ii) transportable over said highways;
   (d) a reservoir joint for mating a lower portion of said precast concrete collar unit with said upper portion of said precast concrete bottom unit to form a substantially watertight seal therebetween;
   (e) a precast concrete top unit removably secured to an upper rim of said precast concrete collar unit with sealing material therebetween, said precast concrete top unit
      (i) allowing insertion or removal of said large primary containment vessel when said precast concrete top unit is removed,
      (ii) being reinforced, and
      (iii) being transportable over said highways;
   (f) a manhole in said precast secondary containment vault allowing access therethrough by said human for said physical and visual inspection of said large primary containment vessel and possible repair without removing said large primary containment vessel from said precast secondary containment vault;
   (g) means for supporting said large primary containment vessel above said upper surface of said cavity of said precast concrete bottom unit a distance sufficient to allow said physical and visual inspection of a lower surface of said large primary containment vessel by said human;

(h) means for access into said precast secondary containment vault to (1) a sump location point and/or (2) said large primary containment vessel, during normal usage said means for access allowing external connections therethrough to said large primary containment vessel while preventing said external fluids from entering said secondary containment vault; and (i) said precast concrete bottom unit, said precast concrete collar unit and said precast concrete top unit forming said precast secondary containment vault that is watertight during normal usage, but allowing access to said large primary containment vessel; said precast concrete bottom unit, said precast concrete collar unit and said precast concrete top unit being capable of withstanding said vertical and lateral forces and said corrosive affects of said soil when assembled.

2. The invention of claim 1 further comprising (a) a plurality of bottom channels integral with said precast concrete bottom unit, said bottom channels extending contiguously through a first side of said precast concrete bottom unit, a floor of said precast concrete bottom unit, and a second side of said precast concrete bottom unit;

(b) a plurality of collar channels integral with said precast concrete collar unit and strategically aligned with said bottom channels, said collar channels extending contiguously from said upper rim of said precast concrete collar unit to said lower portion of said precast concrete collar unit;

(c) a plurality of post-tensioning strands,
 (i) said post-tensioning strands movably positioned through said collar channels and said bottom channels,
 (ii) said post-tensioning strands removably securing said precast concrete collar unit to said precast concrete bottom unit at said reservoir joint,
 (iii) said post-tensioning strands strengthening said secondary containment vault and ensuring said reservoir joint is substantially watertight, and
 (iv) said post-tensioning strands being secured from said upper rim of said precast concrete collar unit.

3. The invention of claim 1 wherein said reservoir joint is a sloped tongue-in-groove joint comprising:

(a) a tongue projecting upwardly from said upper portion of said precast concrete bottom unit,
 (i) said tongue being narrow at a top surface of said tongue and projecting downwardly and outwardly to an upwardly sloped base creating a bottom channel, and
 (ii) said bottom channel containing a limited volume of a sealant;

(b) a groove located at said lower portion of said precast concrete collar unit,
 (i) said groove being wide at a top surface of said groove and projecting downwardly and outwardly to an upwardly sloped base of said precast concrete collar unit,
 (ii) said groove being wider than said tongue, and
 (iii) said groove being slightly deeper than said tongue is high;

(c) said precast concrete collar unit and said precast concrete bottom unit forming a channel on either side of tongue when said sloped tongue-in-groove joint is joined,
 (i) said channel capable of holding a slightly bigger volume of said sealant than said bottom channel, and
 (ii) said top surface of said tongue and said top surface of said groove do not abut and are not joined by said sealant; and (d) said sloped tongue-in-groove joint being a double sealed joint stabilizing said reservoir joint to lessen any potential leakage of said hazardous fluid contained in said large primary containment vessel through said reservoir joint.

4. The invention of claim 1 further comprising:

(a) said precast concrete top unit being a plurality of precast, pretensioned panels; and (b) a cast-in-place concrete pad attached to said secondary containment vault and being sized and positioned so that an upper face of said precast, pretensioned panels and an upper face of said cast-in-place concrete pad provides a substantially flat surface.

5. The invention of claim 1 further comprising a sump location point for collecting fluid being formed by an inside upper surface of said cavity of said precast concrete bottom unit, said inside upper surface sloping downward from sides of said cavity to form said sump location point.

6. The invention of claim 1 wherein said means for access comprises a double-wall pipe extending through a side of said precast concrete collar unit from a point external to said secondary containment vault to a point internal thereto, (a) said double-wall pipe having an outer wall encircling an inner pipe, (b) said outer wall attached to said side, (c) said inner pipe removably attached to said large primary containment vessel, and (d) said outer wall having a slight downwardly slope as said outer wall extends from said point external to said secondary containment vault to said point internal thereto to direct said hazardous fluid from any leaks in said inner pipe to said cavity.

* * * * *